(12) United States Patent
Sharma (10) Patent No.: US 8,833,803 B2
(45) Date of Patent: Sep. 16, 2014

(54) CONNECTING BLOCK

(75) Inventor: Rajeev Sharma, Troy, MI (US)

(73) Assignees: Denso International America, Inc., Southfield, MI (US); Denso Corporation, Kariya-shi, Aichi-ken (JP)

( * ) Notice: Subject to any disclaimer, the term of this patent is extended or adjusted under 35 U.S.C. 154(b) by 654 days.

(21) Appl. No.: 13/076,752

(22) Filed: Mar. 31, 2011

(65) Prior Publication Data

US 2012/0248760 A1   Oct. 4, 2012

(51) Int. Cl.
| | |
|---|---|
| *F16L 13/08* | (2006.01) |
| *F16L 39/00* | (2006.01) |
| *F16L 41/08* | (2006.01) |
| *F16L 58/18* | (2006.01) |

(52) U.S. Cl.
CPC ............... *F16L 39/00* (2013.01); *F16L 41/086* (2013.01); *F16L 58/188* (2013.01)
USPC ..................... 285/289.2; 285/124.4; 285/329; 285/416

(58) Field of Classification Search
USPC ................... 285/329, 416, 289.1–289.5, 422, 285/124.1–124.5; 165/172–176, 134.1; 204/196.37
See application file for complete search history.

(56) References Cited

U.S. PATENT DOCUMENTS

| | | | | |
|---|---|---|---|---|
| 1,834,102 A | * | 12/1931 | McCalley ................... | 285/148.8 |
| 4,209,059 A | * | 6/1980 | Anthony et al. .............. | 165/133 |
| 4,502,297 A | * | 3/1985 | Winterer .......................... | 62/515 |
| 4,523,711 A | * | 6/1985 | Kondo et al. .................. | 228/198 |
| 5,526,876 A | * | 6/1996 | Karube .......................... | 165/176 |
| 6,382,678 B1 | * | 5/2002 | Field et al. ......................... | 285/3 |
| 6,543,530 B2 | * | 4/2003 | Watanabe ....................... | 165/178 |
| 2003/0131981 A1 | * | 7/2003 | Kohler et al. .................. | 165/178 |
| 2007/0205598 A1 | * | 9/2007 | Katoh et al. ..................... | 285/30 |
| 2009/0266104 A1 | * | 10/2009 | Ichiyanagi ....................... | 62/498 |
| 2010/0089561 A1 | | 4/2010 | Sharma | |
| 2010/0225106 A1 | | 9/2010 | Newman et al. | |

FOREIGN PATENT DOCUMENTS

JP          57-25227          2/1982

OTHER PUBLICATIONS

Office Action dated Dec. 23, 2013 in corresponding Chinese Application No. 201210085984.9.
Office Action issued in corresponding DE Application No. 102012102384.0 received by DE attorney on Sep. 6, 2013 (with English translation).

* cited by examiner

*Primary Examiner* — James Hewitt
*Assistant Examiner* — Jay R Ripley
(74) *Attorney, Agent, or Firm* — Harness, Dickey & Pierce, P.L.C.

(57) ABSTRACT

A connecting block includes a first member having a flow header extending from a sealing surface, a planar end face oppositely directed with respect to the sealing surface, and a perimeter wall angularly oriented with respect to the sealing surface. A second member is slidably received within the perimeter wall of the first member and has a flow member receiving bore axially aligned with the flow header. A bonding zone is created by heating both the first and second members until the planar end face and the planar interior face join together to create a physical connection between the first and second members. A material of the second member is corrosively sacrificial with respect to a material of the first member.

14 Claims, 7 Drawing Sheets

CONNECTING BLOCK

FIELD

The present disclosure relates to a connecting block for fluid transfer.

BACKGROUND

This section provides background information related to the present disclosure which is not necessarily prior art.

One-piece connecting blocks having one or more fluid tubes and one or more flow headers acting as adapters between components such as heat exchangers and system fluid tubing are known. Such connecting blocks can be made of aluminum or a similar corrosion resistant material, which also is acceptable for fluid connection methods such as brazing. Because of the complex geometry required to provide both male extending members which are adapted to receive a fluid tube, and oppositely directed female tubing receiving bores, known one-piece connecting blocks are commonly made by entirely machining the connecting block from a single piece of material such as an extruded rod. Known one-piece connecting blocks are therefore expensive to produce. A further issue with known one-piece connecting blocks is that corrosion occurring at or proximate to the male extending members or female tubing receiving bores creates leak paths and/or restricts the ability to obtain acceptable fluid connection joints.

SUMMARY

This section provides a general summary of the disclosure, and is not a comprehensive disclosure of its full scope or all of its features.

According to several embodiments, a connecting block includes a first member having at least one flow header extending from a sealing surface, and a planar interior face oppositely directed with respect to the sealing surface. A second member is slidably received by the first member and has at least one flow member receiving bore axially aligned with the at least one flow header. A material of the second member is corrosively sacrificial with respect to a material of the first member.

According to further embodiments, a connecting block includes a first member having a flow header extending from a sealing surface, a planar end face oppositely directed with respect to the sealing surface, and a perimeter wall angularly oriented with respect to the sealing surface. A second member is slidably received within the perimeter wall of the first member and has a planar interior face and a flow member receiving bore axially aligned with the flow header. A bonding zone is created by heating both the first and second members until the planar end face and the planar interior face join together to create a physical connection between the first and second members.

According to other embodiments, a connecting block includes a first member having first and second flow headers extending from a sealing surface, a planar end face oppositely facing with respect to the sealing surface, and a perimeter wall perpendicularly oriented with respect to the sealing surface. A second member is slidably received within the perimeter wall of the first member. The second member has a planar end face, a first flow member receiving bore axially aligned with the first flow header, and a second flow member receiving bore axially aligned with the second flow header. A material of the second member being corrosively sacrificial with respect to a material of the first member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
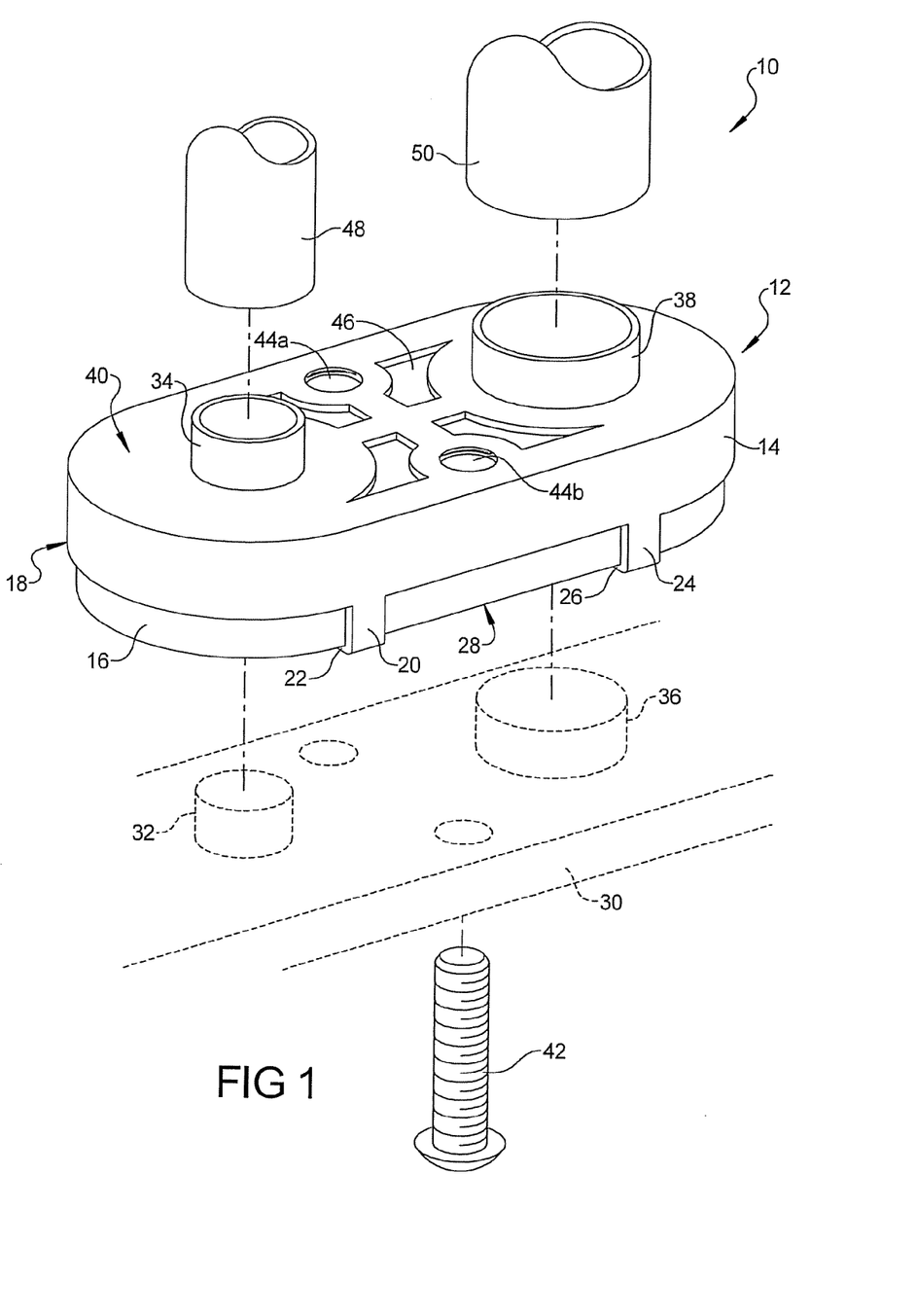
FIG. 1 is a front elevational perspective view of a connecting block of the present disclosure.

Referring to FIG. 1, a connecting block assembly 10 includes a connecting block 12 having a first member 14 connected to a second member 16. Second member 16 is slidably received within a perimeter wall 18 of first member 14. First member 14 further includes a plurality of first tabs 20 each providing a tab deflected end 22 extended beneath second member 16 to releasably retain second member 16 and a plurality of second tabs 24 which each include a tab deflected end 26 similarly deflected beneath second member 16 to retain second member 16 in contact with first member 14. Opposite ones of first and second tabs 20, 24 are not clearly visible in this view. Each of the first and second tabs 20, 24 deflect into contact with an outside facing planar end face 28 of second member 16.

Connecting block 12 is adapted for connecting to a manifold 30 such that a first manifold flow member 32 is received within second member 16 and is coaxially aligned with a first flow header 34 such that flow through first manifold flow member 32 also passes through first flow header 34. Similarly, manifold 30 can also include a second manifold flow member 36 which is also received within second member 16 and coaxially aligned with a second flow header 38 integrally connected to and extending from a planar sealing surface 40 of first member 14. First flow header 34 also is integrally connected to planar sealing surface 40. Connecting block 12 can be fastenably connected to manifold 30 using a plurality of fasteners 42 each extending through second member 16 and threadably engaged with individual threaded apertures 44 created through planar sealing surface 40 of first member 14.

In order to assist with the sliding fit between second member 16 and first member 14 as second member 16 is slidably received within the perimeter wall 18 of first member 14, first member 14 further includes at least one and, according to several embodiments, a plurality of apertures 46 extending through planar sealing surface 40. As second member 16 is slidably received within the space defined by perimeter wall 18, air or other fluid that is positioned between first and second members 14, 16 escapes through any of the individual apertures 46.

Connecting block 12 is further adapted such that a diameter of first flow header 34 is sized to slidably receive a first fluid tube 48 which is then fixedly connected to first flow header 34, for example using a brazing or similar connecting process. Similarly, second flow header 38 is sized to slidably receive a second fluid tube 50 which also can be permanently connected using a brazing process. The surface defined by planar sealing surface 40 is protected against corrosion such that the sealing bond created between first fluid tube 48 and first flow header 34 and further between second fluid tube 50 and second flow header 38 can also extend into contact between each of the first and second fluid tubes 48, 50 at an end of the fluid tubes with the planar sealing surface 40. In order to maintain the planar sealing surface 40 substantially free of corrosion, a material of second member 16 is selected to have a higher reactance and, therefore to galvanically protect first member 14 by permitting corrosion to take place on second member 16. Materials selected for each of the first and second members 14, 16 can be aluminum with the material of second member 16 selected from a different grade or type of aluminum such that second member 16 is corrosively sacrificial with respect to first member 14. Although aluminum is herein identified as a potential material for each of the first and second members 14, 16, other metals or materials which are suitable for connection using a brazing process can also be used.

Figure 2:
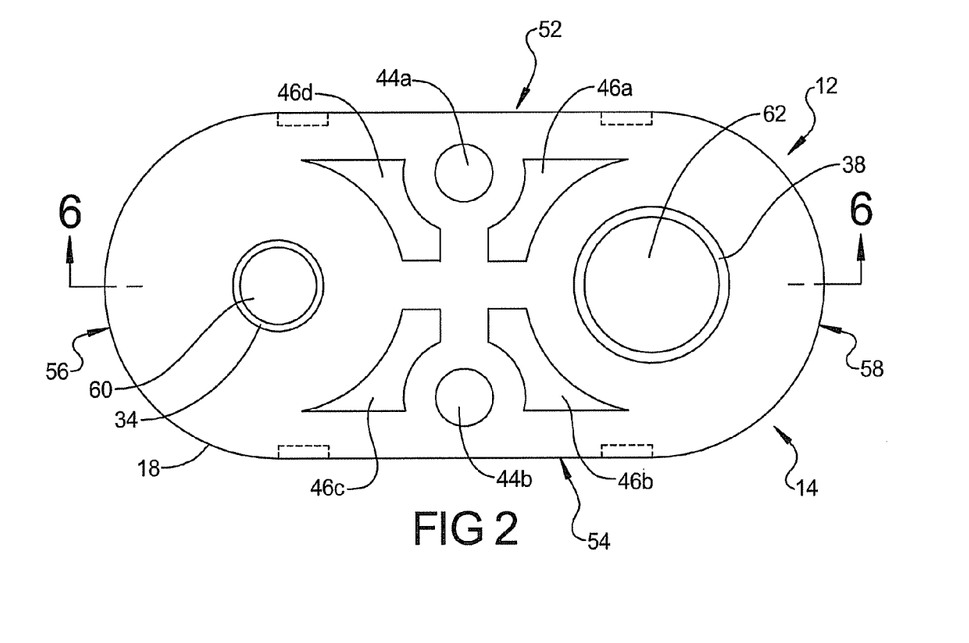
FIG. 2 is a top plan view of a first connecting block member of the connecting block of FIG. 1.
Figure 4:
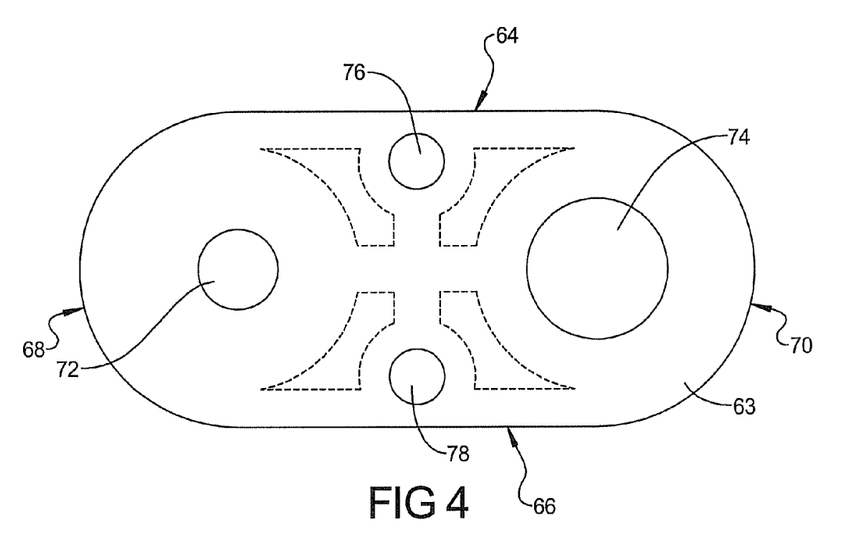
FIG. 4 is a top plan view of a second connecting block member of the connecting block of FIG. 1.

Referring to FIG. 2, further features of first member 14 include opposed first and second straight edges 52, 54 which according to several embodiments are oriented parallel to each other. Opposed first and second curved ends 56, 58 are also provided. A geometry of the perimeter wall 18, defined by first and second curved ends 56, 58 and first and second straight edges 52, 54, is therefore mimicked by the geometry of second member 16 as will be further shown and described in reference to FIG. 4.

Apertures 46 are provided to maximize the ability of removing fluid, such as air trapped between the first and second members 14, 16. Apertures 46 can be configured as mirror image arrangements with respect to an axis defined through threaded apertures 44a, 44b. For example, aperture 46a is a mirror image configuration of aperture 46d and aperture 46b is a mirror image configuration of aperture 46c. The first flow header 34 defines a first flow port 60 extending through first member 14. Similarly, the second flow header 38 defines a second flow port 62 extending through first member 14.

Figure 3:
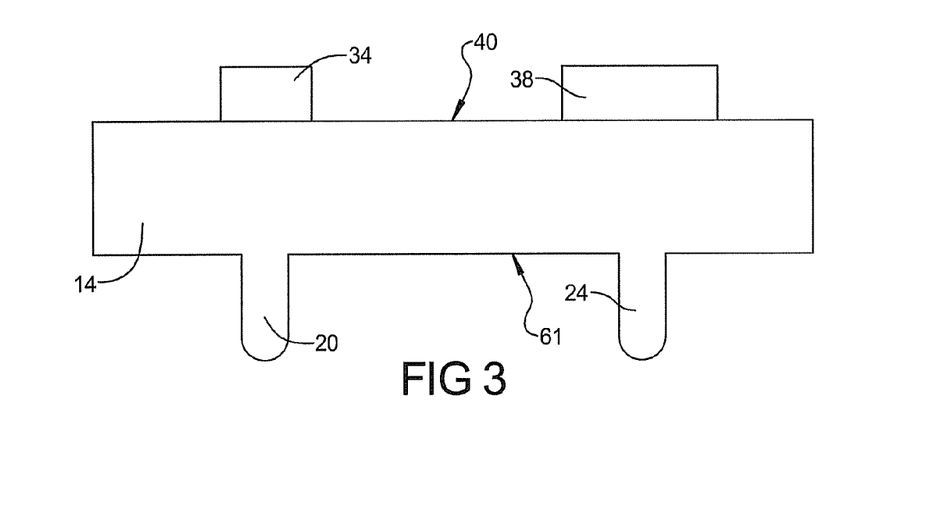
FIG. 3 is a front elevational view of the first connecting block member of FIG. 2.

Referring to FIG. 3, each of the first and second tabs 20, 24 extend freely away from a planar surface 61 which is oriented substantially parallel to planar sealing surface 40. Planar surface 61 is oppositely facing with respect to first and second flow headers 34, 38.

Referring to FIG. 4 and again to FIG. 2, the geometry of second member 16 is similar to although smaller than first member 14 such that second member 16 is slidably received within the perimeter wall 18 of first member 14. Second member 16 therefore includes oppositely oriented first and second straight surfaces 64, 66 which, according to several embodiments, are oriented parallel to each other. Second member 16 also includes first and second opposed curved surfaces 68, 70. A second member body 63 includes each of a first flow member receiving bore 72 and a second flow member receiving bore 74. The first flow member receiving bore 72 can be coaxially aligned with the first flow port 60 of first member 14. Similarly, a second flow member receiving bore 74 extending through second member 16 can be coaxially aligned with the second flow port 62 of first member 14. Second member body 63 further includes first and second clearance bores 76, 78 which individually coaxially align with threaded apertures 44a and 44b, respectively, of first member 14. First and second clearance bores 76, 78 therefore have a diameter which permits sliding receipt of the fasteners 42 shown and described with reference to FIG. 1.

Figure 5:
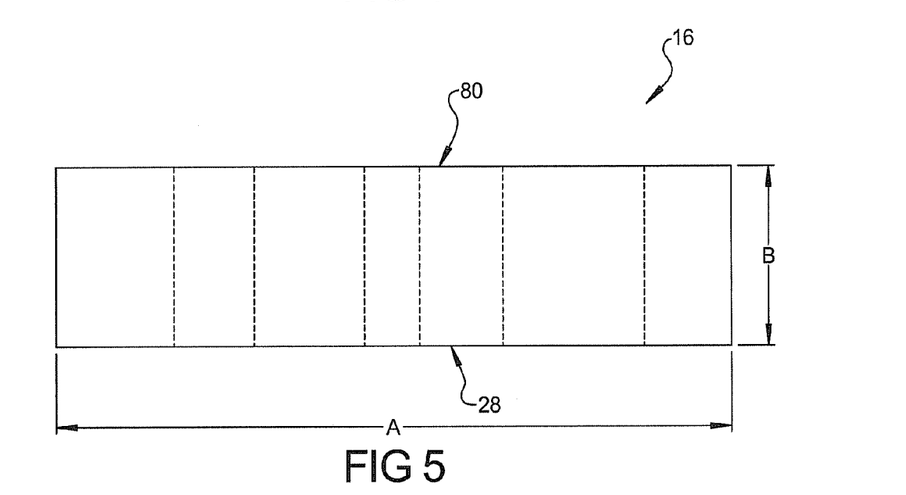
FIG. 5 is a front elevational view of the second connecting block member of FIG. 4.

Referring to FIG. 5, a planar end face 80 of second member 16 is oppositely positioned and oriented substantially parallel to outside facing planar end face 28. A total length "A" of second member 16 and a total height "B" are selected to permit second member 16 to be slidably received within the perimeter wall 18 of first member 14.

Referring to FIG. 6 and again to FIG. 1, second member 16 is aligned with and slidably received within the perimeter wall 18 of first member 14 such that the planar end face 80 of second member 16 abuts against a planar interior face 81 of first member 14. The free ends of each of the first and second tabs 20, 24 are then bent until they contact the outside facing planar end face 28 of second member 16. In this position, first flow member receiving bore 72 is coaxially aligned with first flow port 60 and second flow member receiving bore 74 is coaxially aligned with second flow port 62. Although not clearly evident from this view, second clearance bore 78 is coaxially aligned with threaded aperture 44a. A portion of second member 16 can extend beyond the perimeter wall 18 in a direction oppositely facing with respect to planar sealing surface 40. The length of each of first and second tabs 20, 24 is therefore predetermined to allow for multiple thicknesses, or heights, of second member 16.

Figure 6:
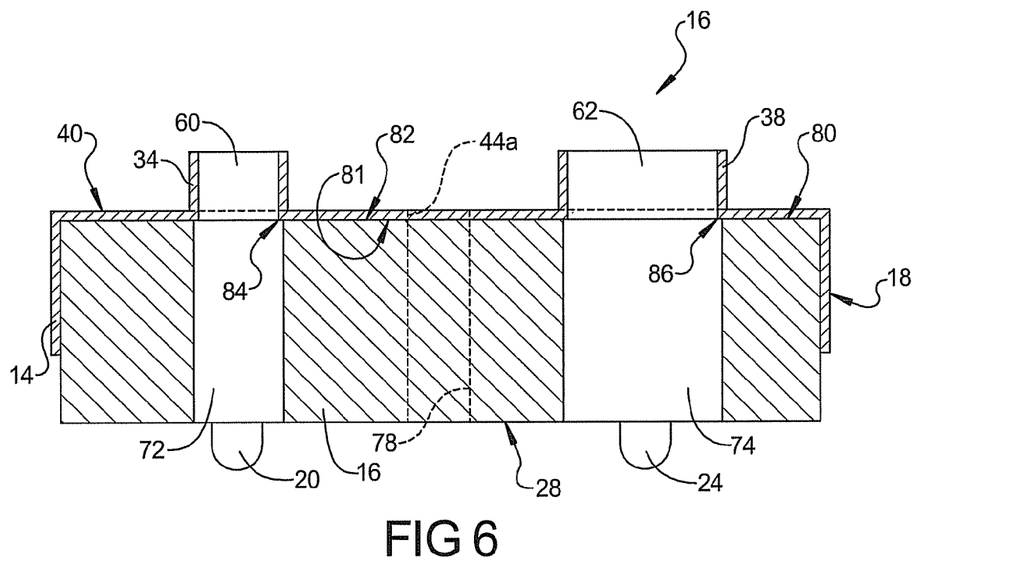
FIG. 6 is a cross sectional front elevational view taken at section 6 of FIG. 2.

After the first and second tabs 20, 24 are deflected to retain first and second members 14, 16 in contact with each other, the first and second members 14, 16 are heated until material of both planar end face 80 and planar interior face 81 melt or fuse together to create a bonding zone 82, thereby permanently connecting second member 16 to first member 14. Bonding zone 82 is electrically conductive, therefore the material of second member 16 which is sacrificial with respect to the material of first member 14 will corrode before the material of first member 14.

With continuing reference to FIG. 6 and again to FIG. 1, the diameters of first and second flow member receiving bores 72, 74 are greater than a corresponding diameter of each of the first and second flow ports 60, 62 such that a first receiving bore end face 84 is defined at an end of first flow member receiving bore 72, and a second receiving bore end face 86 is defined at an end of second flow member receiving bore 74. The function of first and second receiving bore end faces 84, 86 is to provide a positive end stop for first and second manifold flow members 32, 34 when they are slidably received within first and second flow member receiving bores 72, 74, respectively. The first and second manifold flow members 32, 36 can thereafter be permanently fixed (for example by brazing) within each of the first and second flow member receiving bores 72, 74.

Referring to FIG. 7 and again to FIG. 1, according to several embodiments, a first member 88 is modified from first member 14 to include a perimeter wall 89 having a substantially rectangular shape with rounded corners. A body 90 of first member 88 includes a cylinder 91 which can be formed for example using a drawing process that extends material of body 90 to create a cylinder bore 92. A further or continuing drawing process can additionally create a connecting end 93 which defines a through bore 94. A fastener engagement aperture 96 can also be included which functions similar to the threaded apertures 44.

Figure 8:
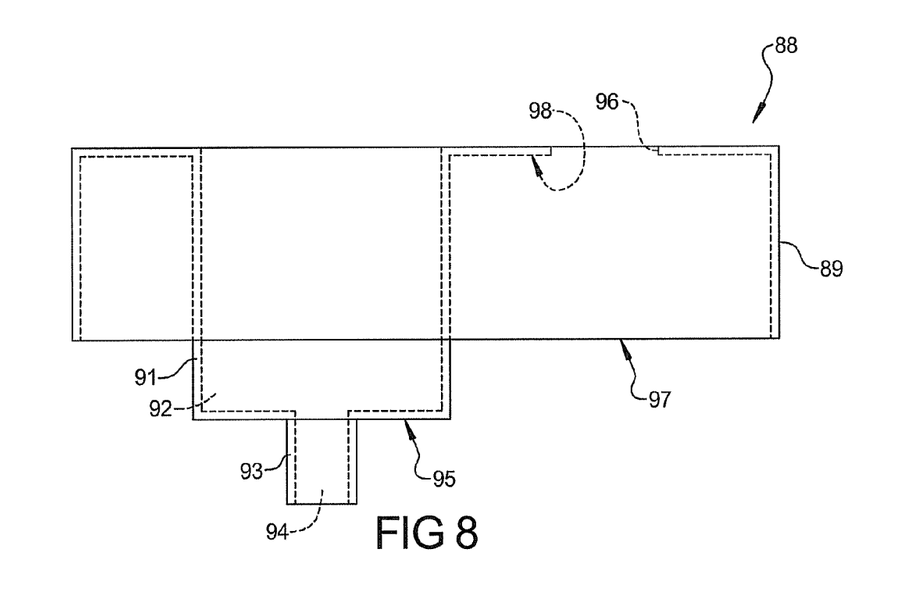
FIG. 8 is a front elevational view of the first connecting block member of FIG. 7.

Referring to FIG. 8, the details of cylinder 91 and connecting end 93 are shown in greater detail. According to several embodiments, cylinder 91 extends beyond a planar surface 97 of perimeter wall 89. A cylinder bore 92 opens into through bore 94 such that fluid within cylinder bore 92 can pass into through bore 94. A sealing surface 95 is defined at a free end of cylinder 91.

Figure 7:
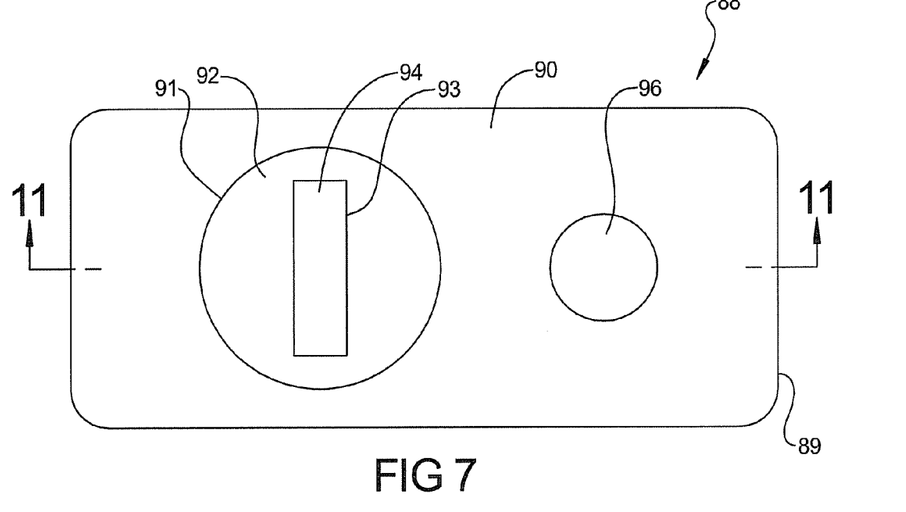
FIG. 7 is a top plan view of first connecting block member of a second connecting block of the present disclosure.
Figure 9:
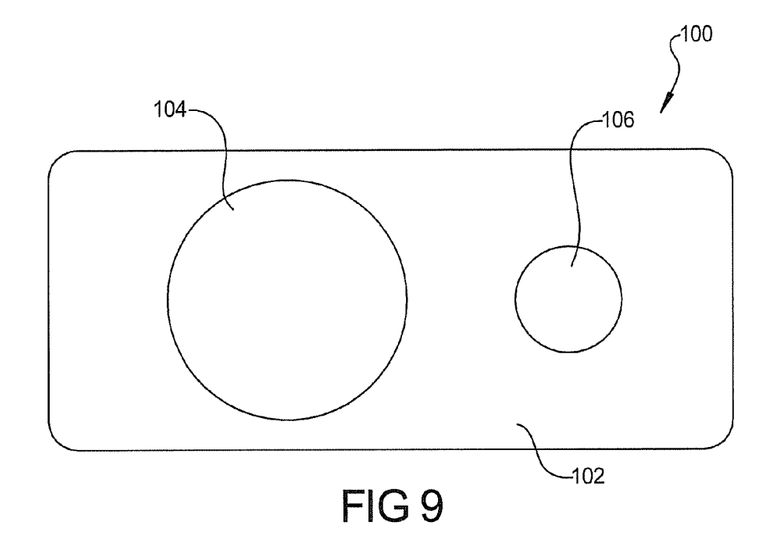
FIG. 9 is a top plan view of a second connecting block member of the second connecting block of FIG. 7.

Referring to FIG. 9 and again to FIGS. 7 and 8, a second member 100, which is adapted to be slidably received within the perimeter wall 89 of first member 88, includes a body 102 of a sacrificial material similar to the material selected for second member 16. A cylinder receiving aperture 104 is created to slidably receive cylinder 91. A fastener clearance aperture 106 is coaxially aligned with fastener engagement aperture 96.

Figure 10:
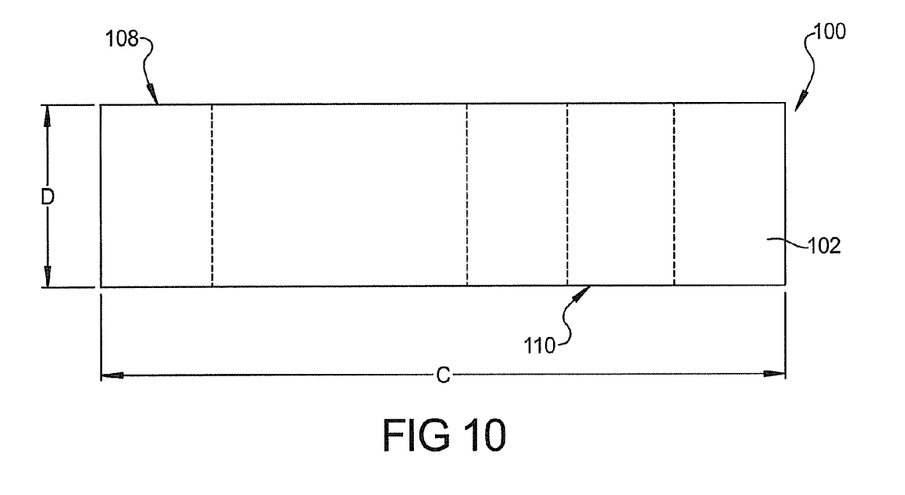
FIG. 10 is a front elevational view of the second connecting block member of FIG. 9.

Referring to FIG. 10, second member 100 can include a length "C" and a height or thickness "D" which are selected to allow the sliding fit of second member 100 with respect to the perimeter wall 89 of first member 88. Body 102 further includes opposed and parallel planar sealing surface 108 and planar end face 110, respectively.

Figure 11:
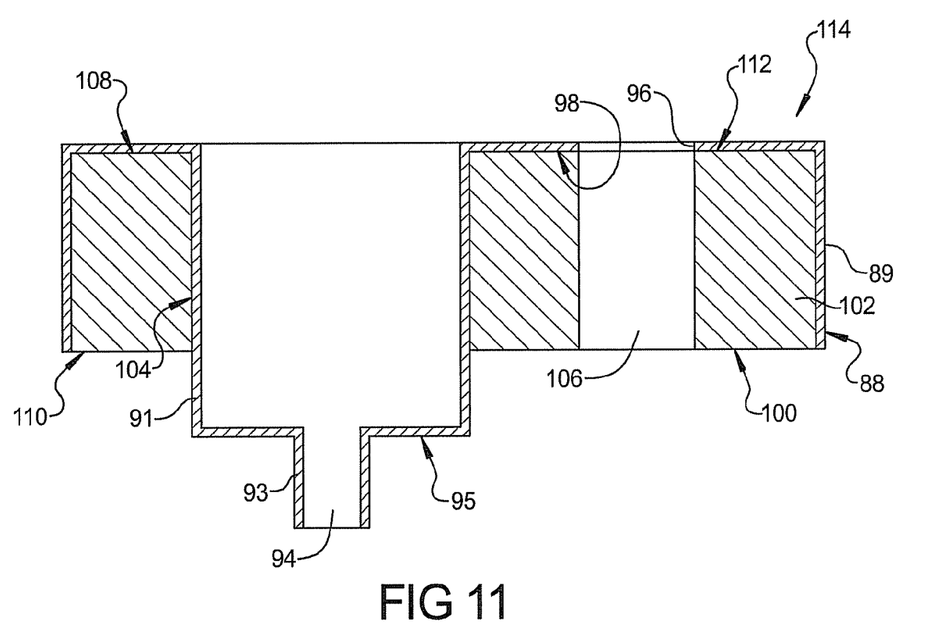
FIG. 11 a cross sectional front elevational view taken at section 11 of FIG. 7.

Referring to FIG. 11 and again to FIGS. 7-10, body 102 of second member 100 is shown after it is slidably received within the perimeter wall 89 of first member 88. In this position, cylinder 91 is slidably received in cylinder receiving aperture 104, and fastener clearance aperture 106 is coaxially aligned with fastener engagement aperture 96. An internal end surface 98 of first member 88 is directly contacted by the planar sealing surface 108 of second member 100. Planar end face 110 can also extend beyond the perimeter wall 89 as shown. When the combination of first and second members 88, 100 is heated, material of each of the internal end surface 98 and planar sealing surface 108 melts and/or fuses to fixedly connect first and second members 88, 100, creating a bonding zone 112. Bonding zone 112 is similar to bonding zone 82 previously described with respect to connecting block 12. When bonding zone 112 is created, a connecting block 114 is thereby also created. The sealing surface 95 of cylinder 91 can be protected against corrosion by selecting the material of second member 100 as a corrosively sacrificial material with respect to the material of first member 88.

Connecting blocks 12, 114 of the present disclosure offer several advantages. By dividing a connecting block into first and second component parts, the second member 16 can be created by cutting specific lengths of material from a pre-extruded bar or stock material having through bores already created therein. By selecting material of the second members to be corrosively sacrificial with respect to a material of the first members, the sealing surfaces of the first members can be protected against corrosion and thereby improve the seal created at the sealing surfaces. This is not possible when the connecting block is entirely made of a single material unless a second secondary sacrificial material is applied which is not a component member of the connecting block. By further use of deflecting tabs, the first and second members can be connected prior to a heating operation which creates the permanent bond or connection between the first and second members. The first members of the present disclosure can be created using a stamping or press operation which is simpler and less expensive than the machining operation previously required for the one-piece connecting blocks known in the art. For example, the shape including the perimeter wall and deflecting tabs can be formed in a stamping or extruding process at the same time with the formation of the flow headers integrally connected to the planar sealing surfaces. This permits a highly accurate geometry for the first members, such that they will slidingly receive the second members maintaining the accurate alignment of the fluid bores.

Material of second members 16, 100 is "corrosively sacrificial", being selected from a material more electrochemically reactive than a material of the first members 14, 88. For example, a material of second members 16, 100 can be an aluminum grade selected from a different grade of aluminum material compared to material of first members 14, 88 to protect the less reactive aluminum metal of first members 14, 88, particularly with respect to the sealing surfaces 40, 95 from corrosion when contacted by fluid and oxygen during use of connecting blocks 12 or 114. The two aluminum metals are in contact at the bonding zones 82, 112 therefore the more reactive metal of the second members 14, 88 reacts first, thereby providing sacrificial or cathodic protection for the first members 16, 100, and more particularly for the sealing surfaces 40, 95 such that corrosion at the sealing surfaces 40, 95 is minimized to maximize the integrity of the proximate fluid joints.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A connecting block, comprising:
a first member having first and second flow headers extending from a sealing surface, a planar interior face oppositely facing with respect to the sealing surface, and a perimeter wall perpendicularly oriented with respect to the sealing surface;
a second member slidably received within the perimeter wall of the first member, the second member having a planar end face in contact with the planar interior face of the first member, a first flow member receiving bore axially aligned with the first flow header, and a second flow member receiving bore axially aligned with the second flow header; and
a material of the second member being corrosively sacrificial with respect to a material of the first member; wherein
the first member includes at least one aperture extending through the first member and the sealing surface, the at least one aperture allowing air to escape when the second member is slidably received within the first member, the contact between the planar end face of the second member and the planar interior face of the first member blocking the at least one aperture; and
further including a bonding zone created by heating both the first and second members until the planar end face and the planar interior face melt or fuse together to create a physical connection between the first and second members; and
wherein the bonding zone is electrically conductive; and
wherein the bonding zone seals a perimeter of the at least one aperture.

2. The connecting block of claim 1, wherein the first member further includes a plurality of tabs extending past the second member when the second member is received in the perimeter wall of the first member, the tabs deflected into contact with an outside facing planar end face of the second member to retain the second member within the perimeter wall of the first member.

3. The connecting block of claim 2, wherein the first and second members are retained together by the plurality of tabs during heating.

4. A connecting block, comprising:
a first member having a flow header extending from a sealing surface, a planar interior face oppositely directed with respect to the sealing surface, and a perimeter wall angularly oriented with respect to the sealing surface;
a second member slidably received within the perimeter wall of the first member and having a planar end face and a flow member receiving bore axially aligned with the flow header, the planar end face of the second member being in contact with the planar interior face of the first member; and
wherein a material of the second member is corrosively sacrificial with respect to a material of the first member; and
a bonding zone created by heating both the first and second members until the planar end face and the planar interior face melt or fuse together to create a physical connection between the first and second members; wherein
the first member includes at least one aperture extending through the first member and the sealing surface, the at least one aperture allowing air to escape when the second member is slidably received within the first member, the contact between the planar end face of the second member and the planar interior face of the first member blocking the at least one aperture; and
wherein the bonding zone is electrically conductive; and
wherein the bonding zone seals a perimeter of the at least one aperture.

5. The connecting block of claim 4, wherein the first member further includes a tab extending past the second member when the second member is received in the perimeter wall of the first member, the tab deflected into contact with an outside facing planar end face of the second member to retain the second member within the perimeter wall of the first member.

6. The connecting block of claim 4, wherein the first member further includes a second flow header extending from the sealing surface, and the second member further includes a second flow member receiving bore axially aligned with the second flow header when the second member is slidably received within the perimeter wall of the first member.

7. The connecting block of claim 4, wherein the first member includes opposed first and second straight edges and opposed first and second curved ends.

8. The connecting block of claim 4, wherein the first member further includes bending tabs integrally connected to the perimeter wall extending away from each of a first and second straight edge and oppositely directed with respect to the sealing surface.

9. The connecting block of claim 4, wherein the first member includes a threaded aperture coaxially aligned with a clearance aperture of the second member, such that a fastener inserted through the clearance aperture can threadably engage the threaded aperture to couple the first and second members.

10. A connecting block, comprising:
a first member having at least one flow header extending from a sealing surface, and a planar interior face oppositely directed with respect to the sealing surface; and
a second member slidably received within the first member and having at least one flow member receiving bore axially aligned with the at least one flow header, a material of the second member being corrosively sacrificial with respect to a material of the first member, the second member defining a planar end face in contact with the planar interior face of the first member; wherein
the first member includes at least one aperture extending through the first member and the sealing surface, the at least one aperture allowing air to escape when the second member is slidably received within the first member, the contact between the planar end face of the second member and the planar interior face of the first member blocking the at least one aperture; and
wherein the second member planar end face is oriented parallel to the planar interior face when the second member is slidably received in the first member; and
further including a bonding zone created by heating both the first and second members until the planar end face and the planar interior face melt or fuse together to create a physical connection between the first and second members; and
wherein the bonding zone is electrically conductive; and
wherein the bonding zone seals a perimeter of the at least one aperture.

11. The connecting block of claim 10, wherein the first member includes a perimeter wall angularly oriented with respect to the sealing surface, the second member slidably received within the perimeter wall of the first member.

12. The connecting block of claim 10, wherein the at least one flow header includes first and second flow headers, and the at least one flow member receiving bore includes a first receiving bore axially aligned with the first flow header and a second receiving bore axially aligned with the second flow header.

13. The connecting block of claim 10, wherein the first member further includes a tab extending past the second member when the planar interior face of the first member contacts the second member, the tab deflected into contact with an outside facing planar end face of the second member to retain the second member in contact with the first member.

14. The connecting block of claim 10, wherein each of the first and second members include coaxially aligned fastener bores configured to receive a fastener to fastenably connect the first and second members.

* * * * *